United States Patent
Provost et al.

(10) Patent No.: US 10,034,135 B1
(45) Date of Patent: Jul. 24, 2018

(54) PRIVACY-SENSITIVE METHODS, SYSTEMS, AND MEDIA FOR GEO-SOCIAL TARGETING

(75) Inventors: Foster J. Provost, New York, NY (US); Alan Murray, New York, NY (US)

(73) Assignee: Dstillery Inc., New York, NY (US)

( * ) Notice: Subject to any disclaimer, the term of this patent is extended or adjusted under 35 U.S.C. 154(b) by 1435 days.

(21) Appl. No.: 13/492,569

(22) Filed: Jun. 8, 2012

Related U.S. Application Data

(60) Provisional application No. 61/494,781, filed on Jun. 8, 2011, provisional application No. 61/548,686, filed on Oct. 18, 2011, provisional application No. 61/558,993, filed on Nov. 11, 2011.

(51) Int. Cl.
G06Q 30/02 (2012.01)
H04W 4/02 (2018.01)
H04W 12/02 (2009.01)

(52) U.S. Cl.
CPC .......... *H04W 4/025* (2013.01); *H04W 12/02* (2013.01)

(58) Field of Classification Search
USPC .......................................................... 705/14
See application file for complete search history.

(56) References Cited

U.S. PATENT DOCUMENTS

| | | | |
|---|---|---|---|
| 4,264,906 A | 4/1981 | Wakatake | |
| 5,431,288 A | 7/1995 | Nishijima et al. | |
| 6,052,730 A | 4/2000 | Felciano et al. | |
| 7,761,326 B2 | 6/2010 | Miyaoku et al. | |
| 8,001,005 B2 | 8/2011 | Pitkow et al. | |
| 8,386,304 B2 | 2/2013 | Chen et al. | |
| 8,386,311 B2 | 2/2013 | Park et al. | |
| 8,396,822 B2 * | 3/2013 | Dasgupta | G06N 99/005 706/50 |
| 8,438,062 B2 | 5/2013 | Rohan et al. | |

(Continued)

OTHER PUBLICATIONS

Office Action for U.S. Appl. No. 14/043,610, dated Dec. 17, 2013.

(Continued)

*Primary Examiner* — Patricia H Munson

(57) ABSTRACT

Privacy-sensitive methods, systems, and media for geo-social targeting are provided. In accordance with some embodiments of the disclosed subject matter, a method for providing media content to users of mobile devices is provided, the method comprising: receiving mobile device information corresponding to a plurality of mobile devices; extracting user instance information and location information associated with each of the plurality of mobile devices from the received mobile device data; generating a location profile for each of the plurality of mobile devices from the extracted location information; generating a geo-social network of mobile devices based on the extracted mobile instance data and the extracted location data, wherein two mobile devices in the geo-social network are linked based on a comparison of the generated location profile; determining a mobile device within the geo-social network having a preferred characteristic and a subset of the plurality of mobile devices linked to the mobile device; and providing the media content to the mobile device and the subset of the plurality of mobile devices.

16 Claims, 7 Drawing Sheets

(56) References Cited

U.S. PATENT DOCUMENTS

| | | |
|---|---|---|
| 8,453,190 B2 | 5/2013 | Liwerant et al. |
| 8,464,302 B1 | 6/2013 | Liwerant et al. |
| 8,548,851 B2 | 10/2013 | Chen et al. |
| 8,577,735 B2 | 11/2013 | Wilen et al. |
| 8,582,565 B1 | 11/2013 | Morsy et al. |
| 8,751,427 B1 * | 6/2014 | Mysen .................. H04L 67/306 705/14.58 |
| 8,762,326 B1 * | 6/2014 | Zhou ................. G06F 17/30864 707/609 |
| 2002/0078191 A1 | 6/2002 | Lorenz |
| 2002/0169892 A1 | 11/2002 | Miyaoku et al. |
| 2006/0167749 A1 | 7/2006 | Pitkow et al. |
| 2007/0157110 A1 | 7/2007 | Gandhi et al. |
| 2007/0157113 A1 | 7/2007 | Bishop et al. |
| 2007/0157114 A1 | 7/2007 | Bishop et al. |
| 2008/0114649 A1 | 5/2008 | Swirsky et al. |
| 2008/0255904 A1 | 10/2008 | Park et al. |
| 2008/0300983 A1 | 12/2008 | Chen et al. |
| 2009/0070706 A1 | 3/2009 | Ranganath et al. |
| 2009/0106778 A1 * | 4/2009 | Pomeroy ................. H04L 41/12 719/328 |
| 2009/0254954 A1 | 10/2009 | Jeong |
| 2009/0327070 A1 | 12/2009 | Etchegoyen |
| 2010/0017278 A1 | 1/2010 | Wilen et al. |
| 2010/0057832 A1 | 3/2010 | Tsun et al. |
| 2010/0198826 A1 * | 8/2010 | Petersen ................. G06Q 10/10 707/737 |
| 2011/0138326 A1 | 6/2011 | Roberts et al. |
| 2011/0191714 A1 | 8/2011 | Ting et al. |
| 2011/0246267 A1 | 10/2011 | Williams et al. |
| 2011/0246297 A1 | 10/2011 | Buchalter et al. |
| 2011/0246298 A1 | 10/2011 | Williams et al. |
| 2011/0270673 A1 | 11/2011 | Lin et al. |
| 2011/0288916 A1 | 11/2011 | Pitkow et al. |
| 2011/0295680 A1 | 12/2011 | Shaw |
| 2011/0302025 A1 | 12/2011 | Hsiao et al. |
| 2011/0307320 A1 | 12/2011 | Tangney et al. |
| 2011/0307321 A1 | 12/2011 | Tangney et al. |
| 2011/0307322 A1 | 12/2011 | Hsiao et al. |
| 2011/0307324 A1 | 12/2011 | Hsiao et al. |
| 2011/0307325 A1 | 12/2011 | Hsiao et al. |
| 2011/0307326 A1 | 12/2011 | Hsiao et al. |
| 2011/0307330 A1 | 12/2011 | Hsiao et al. |
| 2011/0307509 A1 | 12/2011 | Hsiao et al. |
| 2011/0307515 A1 | 12/2011 | Chen et al. |
| 2012/0046995 A1 * | 2/2012 | Petersen ............ G06Q 30/0204 705/7.33 |
| 2012/0078708 A1 | 3/2012 | Taylor et al. |
| 2012/0166272 A1 | 6/2012 | Wiley et al. |
| 2012/0265599 A1 | 10/2012 | Corner et al. |
| 2012/0265603 A1 | 10/2012 | Corner et al. |
| 2012/0303447 A1 | 11/2012 | Hughes et al. |
| 2013/0085841 A1 | 4/2013 | Singleton et al. |
| 2013/0085868 A1 | 4/2013 | Jordan et al. |
| 2013/0166376 A1 | 6/2013 | Cohen et al. |
| 2013/0173358 A1 | 7/2013 | Pinkus |
| 2013/0173382 A1 | 7/2013 | Hasson et al. |
| 2013/0231977 A1 | 9/2013 | Synett et al. |
| 2014/0032326 A1 | 1/2014 | Li et al. |
| 2014/0095297 A1 | 4/2014 | O'Reilly et al. |

OTHER PUBLICATIONS

Office Action for U.S. Appl. No. 14/043,610, dated Apr. 24, 2014.

* cited by examiner

| | Similarity metric | | | range | $d(\vec{x}_1, \vec{x}_2)$ |
|---|---|---|---|---|---|
| 1: | $s_{count}(\vec{x}_1, \vec{x}_2)$ | = | $\vec{x}_{bool,1} \cdot \vec{x}_{bool,2}$ | $[0, \infty)$ | 1 |
| 2: | $s_{bool}(\vec{x}_1, \vec{x}_2)$ | = | $min(s_{count}(\vec{x}_1, \vec{x}_2), 1)$ | $\{0, 1\}$ | 1 |
| 3: | $s_{count,W}(\vec{x}_1, \vec{x}_2)$ | = | $(\vec{w} \circ \vec{x}_{bool,1}) \cdot \vec{x}_{bool,2}$ | $[0, \infty)$ | 1.3 |
| 4: | $s_{cosine}(\vec{x}_1, \vec{x}_2)$ | = | $\dfrac{\vec{x}_1 \cdot \vec{x}_2}{\|\vec{x}_1\|_2 \cdot \|\vec{x}_2\|_2}$ | $[0, 1]$ | 0.74 |
| 5: | $s_{cosine,W}(\vec{x}_1, \vec{x}_2)$ | = | $\dfrac{(\vec{x}_{bool,1} \circ \vec{w}) \cdot (\vec{x}_{bool,2} \circ \vec{w})}{\|\vec{x}_{bool,1} \circ \vec{w}\|_2 \cdot \|\vec{x}_{bool,2} \circ \vec{w}\|_2}$ | $[0, 1]$ | 0.60 |
| 6: | $s_{Jaccard}(\vec{x}_1, \vec{x}_2)$ | = | $\dfrac{s_{count}(\vec{x}_1, \vec{x}_2)}{\|max(\vec{x}_{bool,1}, \vec{x}_{bool,2})\|_1}$ | $[0, 1]$ | 0.33 |
| 7: | $s_{Jaccard,W}(\vec{x}_1, \vec{x}_2)$ | = | $\dfrac{s_{count,W}(\vec{x}_1, \vec{x}_2)}{\|max(\vec{x}_{bool,1} \circ \vec{w}, \vec{x}_{bool,2} \circ \vec{w})\|_1}$ | $[0, 1]$ | 0.26 |
| 8: | $s_{Jaccard,freq}(\vec{x}_1, \vec{x}_2)$ | = | $\dfrac{s_{freq,min}(\vec{x}_1, \vec{x}_2)}{\|max(\vec{x}_1 \circ \vec{x}_{bool,2}, \vec{x}_2 \circ \vec{x}_{bool,1})\|_1}$ | $[0, 1]$ | 0.67 |
| 9: | $s_{Jaccard,freq,W}(\vec{x}_1, \vec{x}_2)$ | = | $\dfrac{s_{freq,min,W}(\vec{x}_1, \vec{x}_2)}{\|max(\vec{x}_1 \circ \vec{x}_{bool,2}, \vec{x}_2 \circ \vec{x}_{bool,1}) \circ \vec{w}\|_1}$ | $[0, 1]$ | 0.67 |

PRIVACY-SENSITIVE METHODS, SYSTEMS, AND MEDIA FOR GEO-SOCIAL TARGETING

CROSS REFERENCE TO RELATED APPLICATIONS

This application claims the benefit of U.S. Provisional Patent Application No. 61/494,781, filed Jun. 8, 2011, U.S. Provisional Patent Application No. 61/548,686, filed Oct. 18, 2011, and U.S. Provisional Patent Application No. 61/558,993, filed Nov. 11, 2011, which are hereby incorporated by reference herein in their entireties.

TECHNICAL FIELD

The disclosed subject matter generally relates to privacy-sensitive methods, systems, and media for geo-social targeting. More particularly, the disclosed subject matter relates to geo-social targeting approaches for privacy-sensitive mobile advertising.

BACKGROUND

Media content, such as advertisements, is created with the goal of having the content viewed or otherwise received by a target audience. Approaches for targeting such media content to these audiences have evolved substantially over the past half century. In particular, as information systems provided access to different sources and different types of data, advertisers added targeting strategies designed around such data. For example, as demographic data became available a few decades ago, contextual targeting—that is, targeting based on inferring audience composition from the context in which the advertisement is to be shown (e.g., a billboard location, a television program, a magazine, etc.)—had to share the spotlight with data-driven demographic targeting, either based on explicit demographic profiles or based on predictive modeling. As data aggregators coalesced and integrated information, such as magazine subscriptions and catalog purchases, psychographic data entered the mix and broadened yet again the space of targeting design.

With the advent of social networking websites, social network targeting approaches have emerged. A member of a social networking website establishes an account and creates relationships with other members and their accounts, thereby connecting the members in a network. When a member connects with other members by proffering or accepting invitations to link their accounts, those members are broadcasting their own social network. In addition to generating these links of association, members of these social network websites provide descriptive personal profiles that include their likes, their dislikes, demographic information, etc. These personal profiles and links to other members create a social network. Social network targeting approaches differ from the above-mentioned targeting approaches because they rely on these explicit linkages between specific individuals. For example, social targeting can include targeting consumers who are linked to each other by a social network or other network of established relationships. Subsequently, social networking websites, such as Facebook, have attempted to use their social network of members with established relationships to implement social network targeting for online advertising with varying degrees of success.

However, these targeting approaches, whether contextual targeting approaches or social network targeting approaches, call for the collection, storage, and use of direct personal information on multiple users. For example, as social networking websites continue to expand, additional social networking data about the users of the social networking websites is collected, stored, and used, leading to increased concerns relating to privacy.

Accordingly, it is desirable to provide privacy-sensitive methods, systems, and media that overcome these and other deficiencies of the prior art. For example, privacy-sensitive methods, systems, and media are provided, where geo-social networks of user instances are created and used to target media content without using or storing data that identifies the user of a particular device or data that identifies the device itself and without using or storing device data, such as particular location information.

SUMMARY

In accordance with various embodiments of the disclosed subject matter, privacy-sensitive mechanisms for geo-social targeting are provided.

In accordance with some embodiments of the disclosed subject matter, a method for providing media content to users of mobile devices is provided, the method comprising: receiving, using a hardware processor, mobile device information corresponding to a plurality of mobile devices; extracting, using the hardware processor, user instance information and location information associated with each of the plurality of mobile devices from the received mobile device data; generating, using the hardware processor, a location profile for each of the plurality of mobile devices from the extracted location information; generating, using the hardware processor, a geo-social network of mobile devices based on the extracted mobile instance data and the extracted location data, wherein two mobile devices in the geo-social network are linked based on a comparison of the generated location profile; determining, using the hardware processor, a mobile device within the geo-social network having a preferred characteristic and a subset of the plurality of mobile devices linked to the mobile device; and providing, using the hardware processor, the media content to the mobile device and the subset of the plurality of mobile devices.

In some embodiments, the plurality of location data includes at least one of: a plurality of Internet protocol (IP) addresses, a plurality of media access control (MAC) addresses, a plurality of service set identifiers (SSID) a plurality of domains, a plurality of global positioning system (GPS) position information, a plurality of wireless (WiFi) location information, a plurality of neighboring access point information, and a plurality of positioning coordinates.

In some embodiments, the location profile includes a distribution of the extracted location information and is associated with the extracted user instance information corresponding to one of the plurality of mobile devices. In some embodiments, the location profile includes a subset of the extracted location information based on substantially accessed locations.

In some embodiments, the method further comprises anonymizing the extracted user instance information and the extracted location information. In some embodiments, the anonymizing further comprises: applying a hash function to each of the extracted user instance information and the extracted location information; and receiving a hashed value associated with each of the extracted user instance information and the extracted location information. In some embodiments, the geo-social network includes the plurality of mobile devices that are identified by anonymized user instance information and that are linked together based on similarity of location information associated with each user instance information.

In some embodiments, the method further includes applying a weight to the link based on the location profiles associated with the two mobile devices in the geo-social network, wherein the weight is based on the number of visits to the location information in the location profiles.

In some embodiments, the method further includes applying a weight to the link based on popularity of location information in the location profiles associated with the two mobile devices in the geo-social network.

In some embodiments, the method further includes: determining a first popularity score for a first mobile device, wherein the first popularity score includes a first visitation frequency of the first mobile device to a location compared to a location frequency; determining a second popularity score for a second mobile device linked to the first mobile device, wherein the second popularity score includes a second visitation frequency of the second mobile device to the location compared to the location frequency; and determining a link strength score associated with the link based on a comparison of the first popularity score with the second popularity score.

In some embodiments, the method further includes determining a link strength score associated with the link based on the number of shared locations in the location profiles of the two mobile devices normalized over a total number of locations visited by the two mobile devices.

In some embodiments, the method further includes applying a weight to the link based on recency of the extracted location information, wherein the extracted location information in location profile is associated with an exponential decay function in response to receiving updated location information.

In some embodiments, the method further includes: comparing a first location profile associated with a first mobile device with a second location profile associated with a second mobile device, wherein the first mobile device is linked to the second mobile device in the geo-social network; and determining a link strength score based on the comparison of the first location profile with the second location profile. For example, the method can include: determining that the link strength score is greater than a predetermined value; and correlating user instance information associated with the first location profile with user instance information associated with the second location profile, wherein the user instance information is identified as the same user on different devices. In another example, the method can include: determining a plurality of first-degree network neighbors to a mobile device; filtering the plurality of first-degree network neighbors based on the link strength score; and providing the media content to the mobile device and the filtered network neighbors. In yet another example, the method can include: determining a plurality of first-degree network neighbors to a mobile device; filtering the plurality of first-degree network neighbors based on a given location associated with a campaign for providing the media content; and providing the media content to the mobile device and the filtered network neighbors within the given location.

In some embodiments, the method further includes receiving a preferred characteristic relating to the media content, wherein the preferred characteristic includes at least one of a user attribute, a user behavior, prior purchase history, a media content viewing, and a media content selection. In some embodiments, the method further includes receiving a seed user instance that corresponds to the mobile device for providing the media content.

In some embodiments, the method further includes: receiving representative locations for generating the location profile; and filtering the extracted location information to include the received representative locations in the location profile.

In accordance with some embodiments of the disclosed subject matter, a method for providing media content to users of mobile devices, the method comprising: receiving, using a hardware processor, mobile device information corresponding to a plurality of mobile devices; selecting, using the hardware processor, a user instance of a mobile device from the received mobile device information; determining, using the hardware processor, location information associated with the user instance of the mobile device from the received mobile device information, wherein the location information comprises a plurality of locations visited by the mobile device; determining, using the hardware processor, a subset of the plurality of mobile devices that visited at least one location of the plurality of locations; and providing, using the hardware processor, the media content to the mobile device and the subset of the plurality of mobile devices.

In some embodiments, the method further includes: determining a geo-social similarity score between the mobile device and each of the subset of the plurality of mobile devices, wherein the geo-social similarity score is based on a comparison of the plurality of locations visited by the mobile device and locations visited by each of the subset of the plurality of mobile devices; filtering the subset of the plurality of mobile devices based on the geo-social similarity score; and providing the media content to the mobile device and the filtered subset of the plurality of mobile devices.

In some embodiments, the geo-social similarity score between the mobile device and each mobile device in the subset of the plurality of mobile devices includes a function for at least one of: location popularity, recency, and visitation frequency.

In accordance with some embodiments of the disclosed subject matter, a system for providing media content to users of mobile devices is provided. The system comprises a hardware processor that: receives mobile device information corresponding to a plurality of mobile devices; extracts user instance information and location information associated with each of the plurality of mobile devices from the received mobile device data; generates a location profile for each of the plurality of mobile devices from the extracted location information; generates a geo-social network of mobile devices based on the extracted mobile instance data and the extracted location data, wherein two mobile devices in the geo-social network are linked based on a comparison of the generated location profile; determines a mobile device within the geo-social network having a preferred characteristic and a subset of the plurality of mobile devices linked to the mobile device; and provides the media content to the mobile device and the subset of the plurality of mobile devices.

In accordance with some embodiments of the disclosed subject matter, a non-transitory computer-readable medium containing computer-executable instructions that, when executed by a processor, cause the process to perform a method for providing media content to users of mobile devices is provided. The method comprises: receiving mobile device information corresponding to a plurality of mobile devices; extracting user instance information and location information associated with each of the plurality of mobile devices from the received mobile device data; generating a location profile for each of the plurality of mobile devices from the extracted location information; generating a geo-social network of mobile devices based on the extracted mobile instance data and the extracted location data, wherein two mobile devices in the geo-social network are linked based on a comparison of the generated location profile; determining a mobile device within the geo-social network having a preferred characteristic and a subset of the plurality of mobile devices linked to the mobile device; and providing the media content to the mobile device and the subset of the plurality of mobile devices.

BRIEF DESCRIPTION OF THE DRAWINGS

Various objects, features, and advantages of the present invention can be more fully appreciated with reference to the following detailed description of the invention when considered in connection with the following drawing, in which like reference numerals identify like elements.

FIG. 3 is an illustrative chart that includes various similarity metrics between the location profiles or location distributions of two devices ($x_i$ and $x_2$) in accordance with some embodiments of the disclosed subject matter.

DETAILED DESCRIPTION

Figure 1:
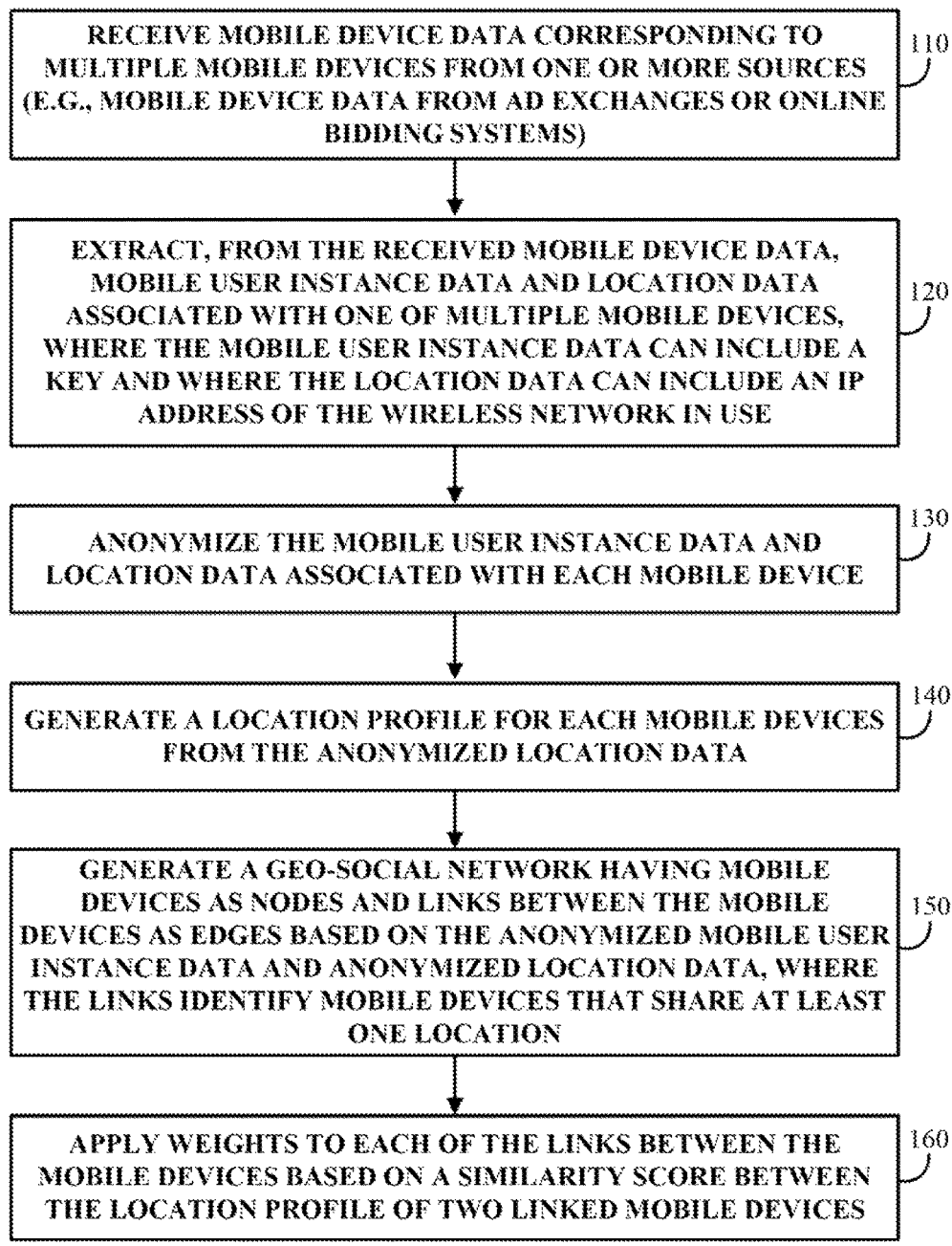
FIG. 1 is a flowchart of an illustrative process for generating a geo-social network of mobile devices based on anonymized mobile instance data and anonymized location data in accordance with some embodiments of the disclosed subject matter.

Generally speaking, mechanisms are provided for creating a geo-social network and using the geo-social network for making predictive inferences such that media content can be provided to multiple devices. For example, the mechanisms can find individuals that are closely linked in a geo-social network to one or more mobile device users known to have a desired audience characteristic (e.g., prior purchase history, brand affinity that includes a website visitation, a positive indication, or a visit to a physical location, key demographics, etc.).

As used herein, a geo-social network can be used to determine the geo-social similarity of instances of consumers on particular devices based on location information. For example, these mechanisms can be used to determine the similarity of instances of consumers (e.g., a first user instance on a first device to a second user instance on a second device) based on commonalities in observed location behavior, which can include a distribution of the location information that the consumers have been observed to visit. That is, two user instances can be linked or otherwise deemed close in proximity the more similar are the distributions of the locations the two user instances visit.

As also used herein, geo-social similarity can be used to connect instances of consumers on particular devices. Geo-social similarity or the similarity of instances of consumers on particular devices is based on a comparison of the distribution of the locations visited by the particular devices. For example, geo-social similarity can be exhibited when two devices share one or more locations within their respective location profiles or distributions of visited locations. In another example, geo-social similarity can be exhibited when two devices share one or more unpopular locations (based on location popularity) and spend a substantial amount of time at those locations (based on device frequency).

These mechanisms can be used in a variety of applications. For example, these mechanisms can use the geo-social networks and/or anonymized location information to determine different user instances that correspond to the same user. In a more particular example, upon determining that two user instances have similar distributions of location information and that the location information includes locations that are infrequently visited by mobile devices (e.g., a residential wireless network, an office wireless network, etc.), these mechanisms can be used to determine different user instances corresponding to the same user such that media content can be provided to the same user on different devices. As such, the geo-social network can be used to target media content to the same user on screens of different devices. In another example, these mechanisms can be used to connect devices with users having similar interests based on anonymized location information—e.g., two users having similar distribution profiles across a set of locations can be identified as close friends (having similar distribution profiles of infrequently visited residential locations) or as hyper-local cohorts (having similar distribution profiles across a set of locations within a particular locale). In yet another example, these mechanisms can be used to provide privacy-sensitive hyperlocal targeting for targeting users in a precise location without needing to store data on the actual locations of users. In a further example, these mechanisms can be used evaluate the success of advertising campaigns across multiple channels by aggregating success metrics across the geo-social network.

Turning to FIG. 1, FIG. 1 is a flowchart of an illustrative process 100 for generating a geo-social network of mobile devices based on anonymized mobile instance data and anonymized location data in accordance with some embodiments of the disclosed subject matter.

Process 100 can begin by receiving mobile device data corresponding to multiple mobile devices at 110. For example, mobile device data corresponding to a large number of mobile users can be received from ad exchanges, online bidding systems, and/or any other suitable sources in the advertising ecosystem. In another example, process 100 can include monitoring mobile device data from data available to advertisers for deciding whether to bid on the user for a particular campaign. It should be noted that, although the embodiments described herein generally refer to receiving mobile device data, any suitable device data can be analyzed. For example, device data corresponding to multiple devices (e.g., laptops, desktop computers, cellular telephones, tablet computing devices, electronic-paper display devices, televisions, etc.) can be received.

In some embodiments, process 100 can extract, from the received mobile device data, user instance data and location data associated with each of the mobile devices at 120. For example, the user instance data extracted from the received mobile device data can include one or more keys that identify the mobile device. In a more particular example, each instance of a mobile user can be associated with a key such that, when the key is received by a geo-social network application, the geo-social network application knows that the key and associated mobile device data corresponds to the same mobile device. In another example, the location data extracted from the received mobile device data can include location data, such as IP addresses, fine-grained latitude/ longitude cells, information from global positioning system circuitry, information from mobile telephone towers, information from wireless network transceivers, or any suitable mechanisms that facilitate the device determining its location.

In some embodiments, the location information can include IP addresses of the wireless networks accessed by or associated with a mobile device. The location information can also include recency and/or frequency information associated with each location. In a more particular example, the location information can be received one-by-one in a data stream, where the location information is received along with identification information (e.g., an identifier of a mobile device). Upon monitoring a data stream that includes location information, the geo-social network can be continuously updated in response to receiving new and/or updated location information for one or more mobile devices.

It should be noted that any other suitable data can be extracted from the received mobile device data. In addition to user instance information and location information, brand actions or logged actions (e.g., website visitations, conversions, etc.) can be received for one or more of the mobile devices. More particularly, when a key is received or detected, the geo-social network application can determine whether subsequent actions (e.g., website visitations, purchases, etc.) have been taken by a particular mobile device associated with that key. For example, a data stream that includes brand actions can be monitored for determining which mobile devices and neighboring mobile devices may be future brand actors. In some embodiments, different types of location information can be extracted from the received mobile device data, such as MAC addresses, IP addresses, SSID, GPS position information, WiFi information, neighboring access point information, etc.

In some embodiments, the user instance information that identifies mobile devices and/or the location information can be anonymized prior to use by the geo-social network application at 130. For example, at the outer wall of the system executing the geo-social network application, an irreversible hash function can receive user instance data that identifies mobile devices (including a key that identifies a mobile device) and/or location information (including IP addresses or latitude/longitude information corresponding to locations visited by or associated with a mobile device) and irreversibly hash each piece of user instance information or location information to a random key. It should be noted that, upon receiving the same user instance information and/or location information, the hash function of the geo-social network application hashes the user instance information and/or location information to the same random key. Alternatively, the hash function can has several original values to the same key, thereby increasing privacy while decreasing accuracy. It should further be noted that, for geo-social targeting using geo-social networks, there is no need for non-anonymized identifiers, demographics, geographies, psychographies, etc.

In some embodiments, the random anonymized keys generated by the hash function that cannot be used to identify a particular location, a particular mobile device, or a particular user can be stored in a database or any other suitable storage device. For example, in response to generating anonymized keys for user instance information, location information, or any other suitable mobile device data, the geo-social network application can associate the anonymized location keys and the anonymized user instance key and store the anonymized keys in a database or any other suitable storage device. In this example, In some embodiments, multiple hash functions or non-unique hash functions can be applied. For example, when desiring additional privacy, the geo-social network application can apply multiple hash functions to the user instance information and/or location information such that hashing is done irreversibly many-to-one. In this embodiment, with additional applications of these hash functions, the random key may then become increasingly difficult to associate with a particular location, a particular mobile device, or a particular user.

Referring back to FIG. 1, at 140, a location profile for each mobile device can be generated from the anonymized location data. More particularly, each mobile device identified by an anonymized user instance key can be represented by a profile of behavior across locations. For example, the location profile associated with the mobile device can be a distribution of visitation probabilities across multiple locations (e.g., IP addresses). In a more particular example, the location profile can be a distribution of visitation probability across every location accessed by the mobile device. In another more particular example, the location profile can be a distribution of visitation probabilities across the top ten locations accessed by the mobile device. In yet another more particular example, the location profile can be a distribution of visitation probabilities across anonymized locations specified by an advertiser.

In some embodiments, location information associated with a mobile device can be received or observed one at a time within a data stream. It should be noted that, as new location information for a mobile device is received, an updated location profile or distribution of behavior across locations can be generated for the mobile device. For example, an anonymized key-location event can be received, where the key is associated with a particular mobile device and the location information is used to update the distribution or profile associated with the mobile device.

In some embodiments, location information associated with a mobile device can be retrieved from the device data in response to identifying a new device. For example, upon receiving anonymized user instance information and determining that the user instance has not been analyzed or placed in a geo-social network, the anonymized location information associated with the anonymized user instance information can be retrieved and a location profile can be generated.

Additionally or alternatively, a location profile associated with the mobile device can be a vector of observed visitations to locations. In a more particular example, the location profile can be a sparse vector of frequencies of observed visitations to locations, where each mobile device is observed at a relatively small subset of locations out of a large total set of locations.

As described above, for the location profile, the set of locations can be inhibited to a particular subset of locations. For example, a device can be represented by an approximate distribution that includes the current top-k locations (e.g., top twenty) and a catch-all other locations. This can allow, for example, a desired degree of sparseness while maintaining an accurate representation of the representative locations visited by the device.

In some embodiments, the location profile associated with the mobile device can be a set of multiple distributions of different types of location information. For example, the location profile can include a first distribution of MAC addresses of the wireless access point visited or associated by the mobile device, a second distribution of geographic coordinates (e.g., from triangulation information based on signal strength information) visited by the mobile device, and/or a third distribution of user actions performed by the mobile device (e.g., click advertisement, view webpage, purchase product, etc.).

At 150, a geo-social network of devices can be created. To create the geo-social network, a graph is generated having the devices as nodes and the links between the devices as the edges. For example, a link can be established between two devices that share at least one specific location (e.g., a specific IP address, a specific set of position coordinates, etc.). More particularly, two devices can be connected in the geo-social network when the two devices share a visited and anonymized location and can be connected more closely as the two devices share additional location information. As described herein, the strength of the link between two devices can be based on the similarity in the distribution of the locations (e.g., anonymized IP addresses) that they visit. The strength of the link between two neighboring devices can be stronger when more IP addresses or locations are shared. In addition, as also described herein, the IP address or location information for a location that is not commonly visited (e.g., a residential wireless network) can contribute to more similarity and more strength of the link than IP addresses or location information for locations that are frequently visited (e.g., a publicly accessible wireless network at a local coffee shop).

It should be noted that the geo-social network can be fine-grained based on shared and anonymized location information, such as anonymized IP address, fine-grained latitude and longitude cells, or geographic tracts. In each geo-social network, first-degree network neighbors can share at least one location. As the number of shared locations between two devices increases, the probability that the two devices belong to the same individual or same user increases. For example, it is likely that two devices observed primarily at three locations—a residential IP address, an office IP address, and an IP address of a coffee shop—are devices that belong to the same user.

It should also be noted that a geo-social network that links devices sharing anonymized location information, such as anonymized IP address, fine-grained latitude and longitude cells, or geographic tracts, can link devices by approximate wealth, income, demographics, employer, educational institution, interests, community, shopping habits, etc. Upon inferring such information from the location information (e.g., wealth, income, demographics, interests, friends, etc.), such inferred information can be appended to the location information or location profile associated with each device. The inferred information can be used to link devices and/or modify the link strength or weights between particular devices. In some embodiments, the geo-social network that links devices sharing anonymized location information can capture social networks without having to receive and/or store user identification information and relationship information.

In some embodiments, the geo-social network can be created by randomly selecting a single device (sometimes referred to herein as a seed device) from the anonymized user instance information and anonymized location information. As each neighboring device of the randomly selected device shares at least one location in its location profile with the randomly selected device, the anonymized location information associated with the randomly selected device is retrieved and the devices (identified by anonymized user instance information) having a location profile that includes at least one of the anonymized locations are added as neighbors. The location profile or location distribution of each of these neighboring devices can be retrieved.

Figure 2A:
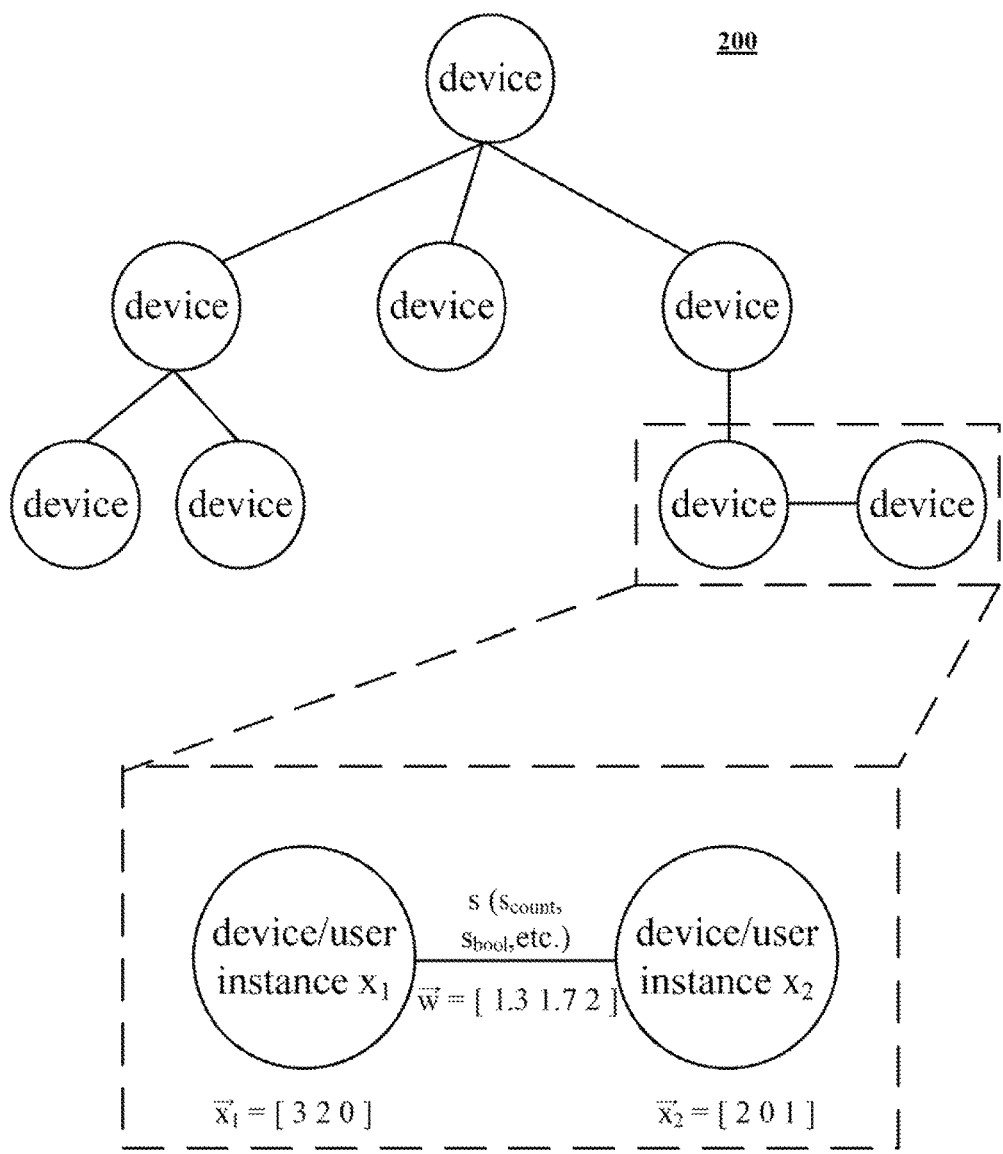
FIG. 2A is an illustrative geo-social network, where two devices are connected by a link that link having an associated similarity metric in accordance with some embodiments of the disclosed subject matter.
Figure 2B:
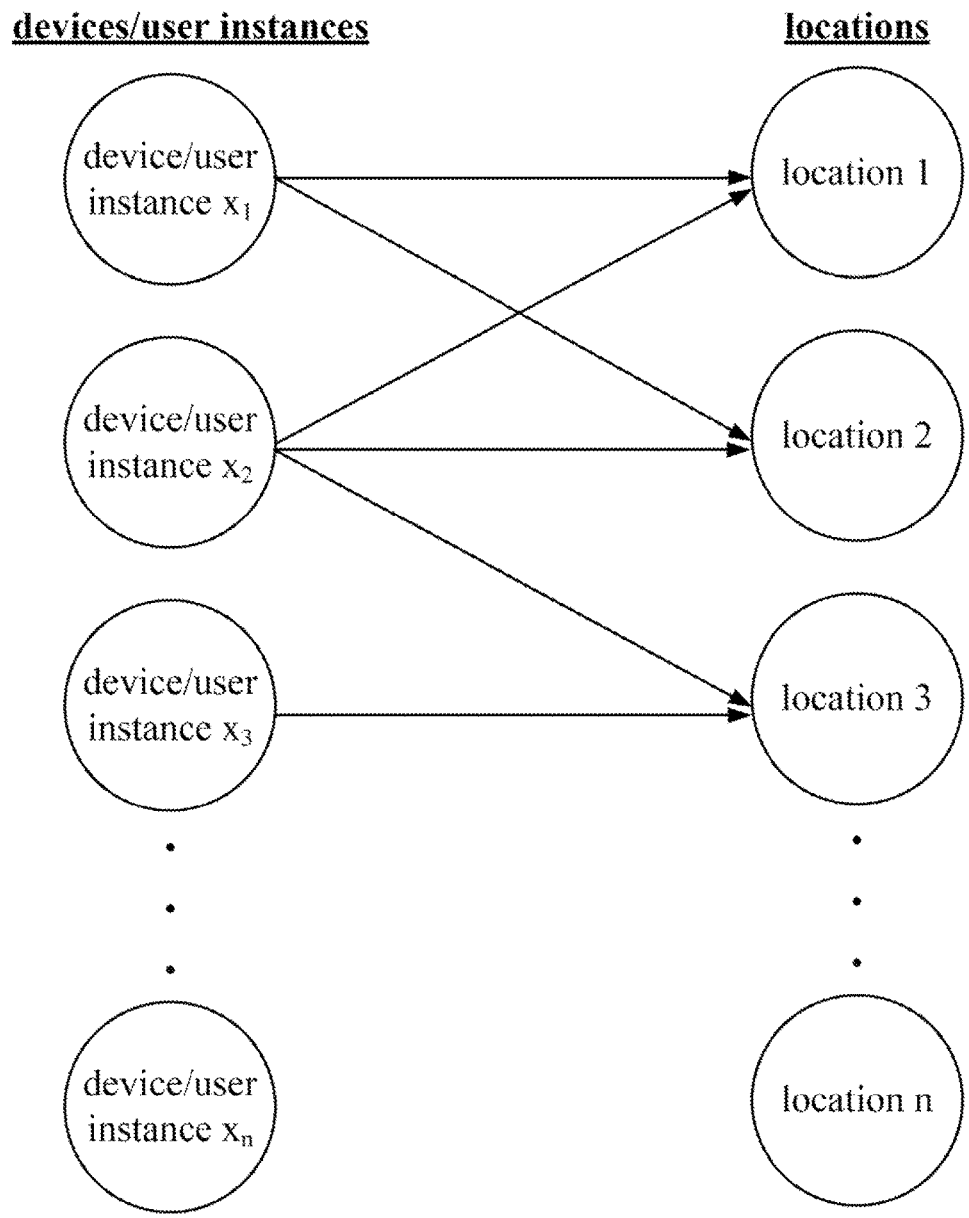
FIG. 2B is an illustrative bipartite network between user instances (devices) and locations in accordance with some embodiments of the disclosed subject matter.

An illustrative example of a geo-social network is shown in FIG. 2A. As shown, the user instances or devices are placed as the nodes in the geo-social network and the links between the devices are placed as the edges. Each of the links can have additional attributes (e.g., similarity metrics or scores, weights, etc.). Alternatively, as shown in FIG. 2B, a bipartite network 250 between user instances and locations can be created. To create the bipartite network, the devices are linked to particular locations within their respective location profiles. Geo-social similarity between devices can be based at least in part on a function of their interconnection. For example, inferences regarding a subset of the devices and their connections with particular locations can be drawn from the bipartite network 250.

It should also be noted that, although the embodiments described herein generally describe that the geo-social network is created from anonymized user instance information and anonymized location information, this is merely illustrative. Some user instance information and location information may not need to be anonymized, while remaining privacy friendly. Alternatively, the degree of privacy can be controlled in the geo-social network by providing one or more hash functions for selectively hashing particular types of mobile device data, such as IP addresses and unique device identifiers (UDID).

As described herein, network proximity or the link between devices can be defined using multiple weighting approaches. For example, the link can be unweighted, where a link can be established between two devices upon determining that the location profiles of two devices share at least one location. In another example, the link can be weighted based on device location distribution (e.g., shared, shared weighted by visits, similarity, etc.). In yet another example, the link can be weighted based on popularity that takes into account device frequency and location frequency. In a further example, the link can be weighted based on recency.

In some embodiments, the geo-social network application can determine which devices to link together in the geo-social network and can implement a weighted approach to place weights on the links between devices in the geo-social network at 160. For example, for two devices that share at least one location in their location profiles, a weight can be assigned to the link between the two devices based on a function of their location profiles. In a more particular example, a weight can be based on the number of shared locations in the location profiles of the two devices. In another more particular example, the number of shared locations in the location profiles of the two devices can be weighted visitation percentages in the location profiles.

It should be noted that each link in a geo-social network can be weighted based on popularity or lack of popularity of the location. For example, the link formed by sharing a location, such as a wireless network in an apartment, with a small number of other devices indicates a stronger geo-social similarity that sharing a location with a substantial number of other devices (e.g., a publicly accessible wireless network at a coffee shop). Moreover, if two devices spend a large (and in some instances, predetermined) amount of time at such an unpopular locale (e.g., substantial frequency), such as a wireless network in an apartment, that can indicate a strong similarity. Even further, if two devices have substantially similar location profiles or distributions across several locations, the geo-social network can indicate that a strong similarity is present and that the devices are associated with the same individual (same user on different devices), close friends, family members, roommates, etc.

In some embodiments, the geo-social network application can apply weights to locations for a given device by determining a popularity score. For example, the popularity score can be calculated by dividing the device-specific popularity of the location using the location profile associated with the device (device frequency) by the logarithm of the overall popularity of the location (location frequency). This is sometimes referred to as DF×ILF (device frequency×inverse location frequency). Accordingly, the strength of a link between two devices that share a location can be defined as a function of the corresponding DF×ILF scores.

In a more particular example, the location profile of a device can be represented by a vector $\vec{x}$ of length m, where element i denotes the number of visits to an IP address $IP_i$: $\vec{x} \in \mathbb{R}^m$. In addition, vector $\vec{x}_{bool}$ can be used to represent a binary vector of size m, where element i denotes if the user has visited IP address $IP_i$.

For calculating the similarity between location profiles, the Hadamard product (°) and the inner product (•) can be used and the min operator can be defined to operate on two vectors, as well as on a vector and a scalar. For defining the weight of an IP address by its popularity, popular locations (those that are frequently visited) can be defined to have a lower weight, while unpopular locations (those that are not frequently visited) can be defined to have a higher weight. For example, the weight $w_i$ can be defined as the logarithm of the total number of user instances n divided by the number of unique user instances that visit that specific IP address $n_i$ (the inverse location frequency). These can be represented, for example, as:

$$\vec{z} = \vec{x} \cdot \vec{y}; z_i = x_i \times y_i$$

$$a = \vec{x} \cdot \vec{y} = \Sigma(x_i \times y_i)$$

$$\vec{z} = \min(\vec{x}; \vec{y}); z_i = \min(x_i; y_i)$$

$$\vec{z} = \min(\vec{x}; a); z_i = \min(x_i; a);$$

$$w_i = {}^{10}\log(n/n_i)$$

Using the above-mentioned equations, a similarity score can be determined that measures the strength between two illustrative location profiles corresponding to two devices $\vec{x}_1$ and $\vec{x}_2$. In this example and as shown in the illustrative geo-social network of FIG. 2, the first device ($x_1$) visits $IP_1$ three times and $IP_2$ twice, while the second device ($x_2$) visits $IP_1$ twice and $IP_3$ once. Again, the weight $w_i$ can be defined as the logarithm of the total number of user instances n divided by the number of unique user instances that visit that specific IP address $n_i$ (the inverse location frequency). Accordingly, these can be represented by:

$$\vec{x}_1 = [3\ 2\ 0]$$

$$\vec{x}_2 = [2\ 0\ 1]$$

$$\vec{w} = [1.3\ 1.7\ 2]$$

In some embodiments, one or more similarity metrics or link strength metrics can be generated between the location profiles of the linked devices. Some similarity metrics take into account the unique number of shared locations. Some similarity metrics can take into account the frequency of the visits to these locations and the inverse location frequency (ILF). It should be noted that the similarity metrics that take into account the frequency of the visits to these locations and the inverse location frequency (ILF) are defined by freq and W, respectively, in the following equations.

For example, in some embodiments, a similarity metric, $s_{count}$, can count the number of shared locations between two location profiles. In the example above, as the first device ($x_1$) and the second device ($x_2$) share one location (i.e., $IP_1$), the link strength is 1. In another example of a similarity metric, the inverse location frequency weighted version $s_{count,W}$ sums the ILF values of the shared locations, which means a link strength of 1.3 in this example. In yet another example of a similarity metric, a similarity metric, $s_{bool}$, can be used, where $s_{bool}$ is 1 when a location is shared and 0 otherwise, thereby indicating whether two devices are network neighbors or not.

In another example, a similarity metric, $s_{cosine}$, can measure similarity by taking the cosine of the angle between the two vectors of the location profiles. The Jaccard metric is defined as the size of the intersection over the size of the union. In this case, it counts the number of shared locations and normalizes these over the total of locations both devices have visited. It should be noted that devices that visit many locations have a higher probability to share some location with another device, but the Jaccard metric penalizes for that. For this example, $s_{Jaccard}$ is 1 ($IP_1$) over 3 ($IP_1$, $IP_2$, $IP_3$). These and other similarity metrics are shown in the table below and in. FIG. 3.

TABLE 1

Similarity metrics between two user's location visit distributions $\vec{x}_1$ and $\vec{x}_2$.

| | Similarity metric | range | d ($\vec{x}_1$; $\vec{x}_2$) |
|---|---|---|---|
| 1: | $s_{count}(\vec{x}_1; \vec{x}_2) = \vec{x}_{bool,1} \cdot \vec{x}_{bool,2}$ | $[0, \infty]$ | 1 |
| 2: | $s_{bool}(\vec{x}_1; \vec{x}_2) = \min(s_{count}(\vec{x}_1; \vec{x}_2); 1)$ | $\{0, 1\}$ | 1 |
| 3: | $s_{count,w}(\vec{x}_1; \vec{x}_2) = (\vec{w} \circ \dot{x}_{bool,1}) \cdot \vec{x}_{bool,2}$ | $[0, \infty]$ | 1.3 |

TABLE 1-continued

Similarity metrics between two user's location visit distributions $\vec{x}_1$ and $\vec{x}_2$.

| | Similarity metric | range | d $(\vec{x}_1; \vec{x}_2)$ |
|---|---|---|---|
| 4: | $s_{cosine}(\vec{x}_1; \vec{x}_2) = \dfrac{\vec{x}_1 \cdot \vec{x}_2}{\|\vec{x}_1\|_1 \cdot \|\vec{x}_2\|_1}$ | [0, 1] | 0.74 |
| 5: | $s_{cosine,W}(\vec{x}_1; \vec{x}_2) = \dfrac{(\vec{x}_{bool,1} \circ \vec{w})(\vec{x}_{bool,2} \circ \vec{w})}{\|\vec{x}_{bool,1} \circ \vec{w}\|_1 \cdot \|\vec{x}_{bool,2} \circ \vec{w}\|_1}$ | [0, 1] | 0.60 |
| 6: | $s_{Jaccard}(\vec{x}_1; \vec{x}_2) = \dfrac{s_{count}(\vec{x}_1, \vec{x}_2)}{\|\max(\vec{x}_{bool,1}, \vec{x}_{bool,2})\|_1}$ | [0, 1] | 0.33 |
| 7: | $s_{Jaccard,W}(\vec{x}_1; \vec{x}_2) = \dfrac{s_{count,W}(\vec{x}_1, \vec{x}_2)}{\|\max(\vec{x}_{bool,1} \circ \vec{w}, \vec{x}_{bool,2} \circ \vec{w})\|_1}$ | [0, 1] | 0.26 |
| 8: | $s_{Jaccard,freq}(\vec{x}_1; \vec{x}_2) = \dfrac{s_{freq,min}(\vec{x}_1, \vec{x}_2)}{\|\max(\vec{x}_1 \circ \vec{x}_{bool,2}, \vec{x}_2 \circ \vec{x}_{bool,1})\|_1}$ | [0, 1] | 0.67 |
| 9: | $s_{Jaccard,freq,W}(\vec{x}_1; \vec{x}_2) = \dfrac{s_{freq,min,W}(\vec{x}_1, \vec{x}_2)}{\|\max((\vec{x}_1 \circ \vec{x}_{bool,2}) \circ \vec{w}, (\vec{x}_2 \circ \vec{x}_{bool,1} \circ \vec{w}))\|_1}$ | [0, 1] | 0.67 |

Referring back to FIG. 1, a weight can be applied to each of the links between the devices in the geo-social network based on the similarity metrics between the location profiles of two linked devices.

It should be noted that, although the embodiments described herein generally relate to determining one or more similarity metrics between the IP addresses in the location profiles or location distributions of two linked devices, this is merely illustrative. Any suitable similarity metrics that represent the strength of a link between two devices can be determined. For example, multiple similarity metrics can be determined that include a first similarity metric between MAC addresses accessed by two devices and a second similarity metric between inferred user instance information.

It should also be noted that, in addition to the similarity metrics shown in FIG. 3, any suitable similarity metric can be calculated. For example, a similarity metric can be calculated that measures the probability that both devices share a particular location. In another example, a similarity metric can be calculated that compares the number of network neighbors for each device.

In some embodiments, multiple similarity metrics can be calculated for determining the link strength between two location profiles. For example, an advertiser, marketer, or any other suitable entity can indicate preferred similarity metrics and, based on the indicated preferences, multiple similarity metrics can be calculated, weighted (e.g., based on preference or importance), and combined to generate a similarity score for the link.

In some embodiments, campaign-specific geo-social weightings of links can be created by providing supervised location scores. For example, locations can be weighted by a likelihood ratio—e.g., how likely the location is to be visited by positive devices (a device that has been observed in the past to have taken an action of interest, such as purchasing a product, liking a product, etc.) rather than negative devices.

It should be noted that, in some embodiments, the geo-social network can be created that includes multiple mobile devices, where the devices having links with weights that are greater than a particular threshold value are selected for inclusion in the geo-social network. For example, weights or similarity scores greater than a particular threshold value are selected for the geo-social network to reduce noise.

In some embodiments, the location distributions can encode recency into anonymized location information by applying an exponential decay approach. For example, a location distribution associated with a device can be updated by an additive process with exponential decay, where a new observed location is formulated as a distribution ($d_n$) with a substantial portion of the mass on the single new location. This can then be added to a decayed version of the existing distribution $d_t$, which can be represented as follows:

$$d_{t+1} = \lambda * d_t \oplus (1-\lambda) * d_n$$

It should be noted that $\oplus$ denotes component-wise addition with renormalization.

It should be understood that the above steps of the flow diagram of FIG. 1 and the other flow diagrams described herein can be executed or performed in any order or sequence not limited to the order and sequence shown and described in the figure. That is, some steps can be added, some steps may be omitted, and/or the order of the steps may be re-arranged. Also, some of the above steps of the flow diagram of FIG. 1 can be executed or performed substantially simultaneously where appropriate or in parallel to reduce latency and processing times.

Figure 4:
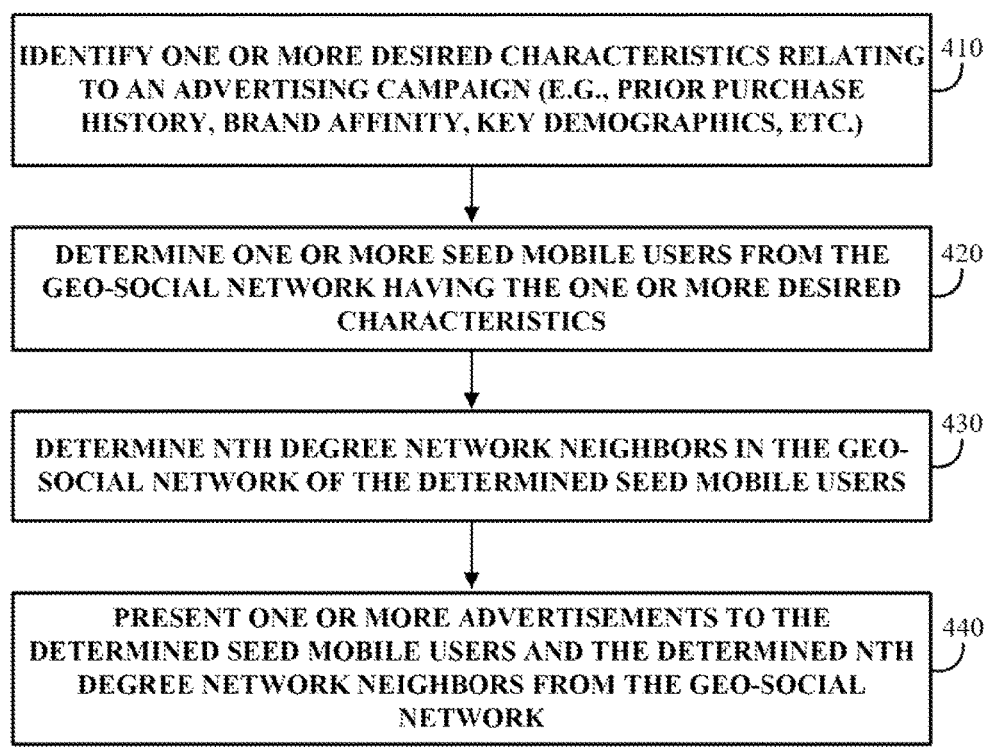
FIG. 4 is a flowchart of an illustrative process for using a geo-social network of mobile devices to deliver targeted advertisements to mobile devices in accordance with some embodiments of the disclosed subject matter.

FIG. 4 is a flow chart of an illustrative process 400 for using a geo-social network of devices to deliver targeted advertisements to mobile devices in accordance with some embodiments of the disclosed subject matter. For example, in some embodiments, the geo-social network can be used to target geo-social network neighbors. In another example, the geo-social network can be used to target the closest neighbors based on one or more determinations of geo-social similarity (e.g., the similarity metrics described above). Advertisers and marketers can use the geo-social network to target the many fragmented instances of individuals in the digital advertising ecosystem as well as users that have similar interests to particular seed users.

In some embodiments, the geo-social network can be used to compose an audience for targeting media content, such as advertisements. At 410, one or more desired characteristics relating to a campaign can be identified. For example, the geo-social network application can receive an indication that the campaign is directed towards devices that have a particular characteristic, such as prior purchase history, brand affinity (e.g., web page visitation (pageview), providing a positive indication towards a brand or product, clicking on an advertisement (ad click), watching media content (ad view), user attribute, user behavior, etc.), key demographics, etc. In response to identifying the one or more desired characteristics of devices for targeting media content, one or more seed users (devices) having the one or more desired characteristics can be determined from the geo-social network at 420.

Alternatively, the identification of one or more desired characteristics and/or the seed users having the one or more desired characteristics can be received from an advertiser or any other suitable entity. For example, in the case of privacy-sensitive hyperlocal targeting of individuals in a precise location without needing to store data on the actual location of users, consider a hyperlocal coupon campaign: a couponing company desires to target special offers for the local restaurant on the corner. The preferred prospects may be those individuals that frequent this precise area. If the restaurant can provide anonymized seed user instance information (e.g., existing clients of the local business identified in an online loyalty program, an exemplary user that fits into the campaign, etc.), the geo-social neighbors of these seed users may have a high probability of also frequenting the same precise location, thereby being good prospects for the hyperlocal coupon. Moreover, it should be noted that, once seed users have been identified from the geo-social network, targeted neighbors of the seed users in the geo-social network creates an audience that includes devices with similar interests and devices that belong to the same individual.

At 430, the n-th degree network neighbors of the seed users in the geo-social network can be determined. For example, as described above, the first-degree network neighbors that share at least one anonymized location with the one or more seed users can be determined. In another example, the first-degree network neighbors that share at least two anonymized locations with the one or more seed users and second-degree network neighbors that share at least two anonymized locations with the first-degree network neighbors can be determined.

Additionally or alternatively, the similarity metrics can be calculated for each link in the geo-social network and the audience for media content can include first-degree network neighbors that share at least one anonymized location with the one or more seed users, where the link between a seed user and a network neighbor has a link strength metric or similarity metric greater than a particular threshold value (e.g., a score greater than 0.75).

At 440, media content (e.g., an advertisement) can be presented to the seed users and the n-th degree network neighbors of the seed users from the geo-social network. As described above, the n-th degree network neighbors can be selected based on degree of separation from the seed user (e.g., first degree devices that share at least one location with the seed user, second degree, third degree, etc.), similarity metric, etc. As also described above, the geo-social network can be used to create an audience for targeting media content to devices that includes devices with similar interests and devices that belong to the same individual. Moreover, by providing seed users and presenting media content to seed users that have been identified as having one or more desired characteristics (e.g., brand affinity), the geo-social network can be used to target different instances of the seed users while also targeting devices with users having similar interests to the seed users.

Alternatively, as opposed to selecting the seed users and the n-th degree of network neighbors to the seed users as an audience for presenting media content, a list of the seed users and the n-th degree network neighbors can be compiled and one or more similarity metrics can be calculated for each device. The seed users and the n-th degree network neighbors can be ranked by the calculated similarity metrics to show which users are more likely to have similar interests. The media content can then be provided to a subset of the ranked devices (e.g., devices having a similarity score or link strength score of at least 0.75, the top ten devices, etc.).

In some embodiments, as opposed to selecting the seed users and the n-th degree of network neighbors to the seed users as an audience for presenting media content, the geo-social network can be used to create predictive features that are incorporated into a predictive model. For example, different network proximity measurements to known brand actors can be incorporated into a predictive model (e.g., a logistic regression model), which can be used to determine how to weight the different network proximity measurements for different campaigns. In another example, the predictive model can be used to combine multiple network proximity measurements with other network measurements, such as network influence measurements.

In some embodiments, the geo-social network can be used to make collective inferences regarding a particular subset of devices, such as a group of devices in a particular location. In the case where location information for the devices is sparse and the locale-affinity network is sparse, a collective inference that includes random field models, belief propagation, relaxation labeling, Markov Chain Monte Carlo (MCMC) techniques, and/or iterative classification can be made about a group of devices in the geo-social network.

Accordingly, privacy-sensitive methods, systems, and media for geo-social targeting are provided.

These geo-social targeting mechanisms can be used in a variety of applications. For example, location data from mobile devices (e.g., smart phones, smart pads, laptops, etc.) can be used to create user/device cohorts, which in turn can be used to target particular content (e.g., advertisements, coupons, offer messages for a product or a service, reward messages, media, and/or any other suitable content) in an effective and privacy-sensitive approach and/or evaluate campaigns across multiple channels. Regarding the evaluation of marketing campaigns across multiple channels, the geo-social network can be used to link screens of the same user (e.g., one or more user instances of the same individual on different devices) and success metrics (without relying on location data) can be aggregated across geo-social network neighbors. In addition, advertisers or any other suitable entity can use the geo-social network to target particular devices (user instances) and then observe the success rates in their respective geo-social neighborhoods. This can, for example, allow a campaign to be evaluated as the success (e.g., conversion rate) of the same individual on different devices can be captured.

In another example, particular neighbors based on network proximity can be targeted with particular content. As described above, by determining similarities between user instances based on commonalities in observed location behavior, these mechanisms can determine connections between different user instances corresponding to the same user, for example, a user on different devices and these mechanisms can connect users with similar interests to provide discriminative targeting.

In one more particular example, the geo-social targeting mechanisms can use anonymized location information to determine the multiple devices corresponding to the same user and, upon determining that the user associated with the different devices is a suitable target for a brand's advertising, transmit one or more targeted advertisements to one or more of the user's different devices.

In another more particular example, the geo-social targeting mechanisms can be used for evaluating the success of a campaign across multiple channels—e.g., an advertisement shown on one device leads to a conversion on another device. The geo-social targeting mechanisms can aggregate success metrics across the geo-social cohort of the targeted users. Accordingly, these geo-social targeting mechanisms can be used for evaluating and attributing the success of an advertising campaign.

In yet another more particular example, the geo-social targeting mechanisms can be used to achieve hyper-local targeting in a privacy-sensitive manner. For example, if the users or egos are chosen to be customers of a local restaurant—e.g., as observed via pixeling an online reservation, a loyalty page, or a coupon page, the geo-social cohorts or neighbors of these egos contain others that not only have similar tastes, interests, and socio-economic status, but are also co-located—e.g., by visiting the same IP addresses. It should be noted that hyper-local targeting can be privacy-sensitive because there is no need to record the actual location information.

Figure 5:
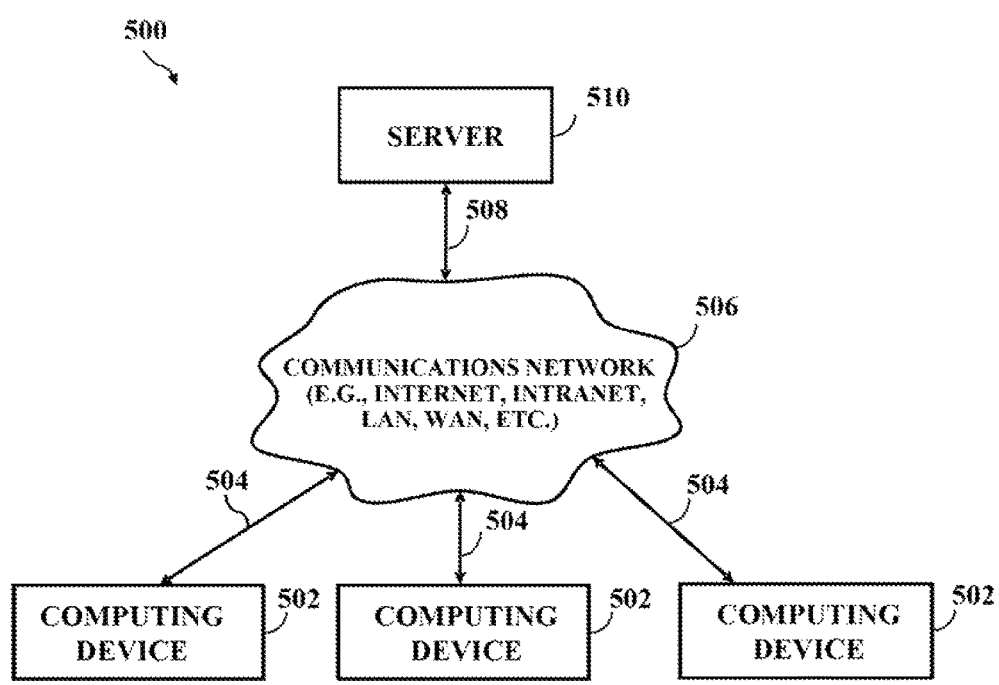
FIG. 5 is a diagram of an illustrative system on which the mechanisms for creating and using geo-social networks can be implemented in accordance with some embodiments of the disclosed subject matter.

FIG. 5 is a generalized schematic diagram of a system 500 on which the geo-social targeting approaches can be implemented in accordance with some embodiments of the disclosed subject matter. As illustrated, system 500 can include one or more computing devices 502, each of which can be used by one of the devices (e.g., mobile telephones, tablet computing devices, laptop computing devices, desktop computing devices, televisions, portable media players, etc.) shown in the geo-social network 200 of FIG. 2. Computing devices 502 can be local to each other or remote from each other. Computing devices 502 are connected by one or more communications links 504 to a communications network 506 that is linked via a communications link 508 to a server 510.

System 500 can include one or more servers 510. Server 510 can be any suitable server for providing access to the geo-social targeting approaches, such as a processor, a computer, a data processing device, or a combination of such devices. For example, the geo-social targeting approaches can be distributed into multiple backend components and multiple frontend components or interfaces. In a more particular example, backend components, such as data collection of anonymized user instance information and location information and data distribution can be performed on one or more servers 510. Similarly, the graphical user interfaces displayed by the geo-social network application, such as a data interface for providing seed user instances or a data interface for providing media content to an audience, can be distributed by one or more servers 510 to computing device 502.

More particularly, for example, each of the computing device 502 and server 510 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, computing device 502 can be implemented as a personal computer, a tablet computing device, a personal data assistant (PDA), a portable email device, a multimedia terminal, a mobile telephone, a gaming device, a set-top box, a television, etc.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 5, communications network 506 can be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 504 and 508 can be any communications links suitable for communicating data between computing devices 502 and server 510, such as network links, dial-up links, wireless links, hard-wired links, any other suitable communications links, or a combination of such links. Computing devices 502 enable a user to access features of the application. Computing devices 502 can be personal computers, laptop computers, mainframe computers, dumb terminals, data displays, Internet browsers, personal digital assistants ("PDAs"), two-way pagers, wireless terminals, portable telephones, any other suitable access device, or any combination of such devices. Computing devices 502 and server 510 can be located at any suitable location. In one embodiment, computing devices 502 and server 510 can be located within an organization. Alternatively, computing devices 502 and server 510 can be distributed between multiple organizations.

In a more particular example, computing devices 502, such as a mobile telephone, a tablet computing device, a laptop computing device, a desktop computing device, a network-enabled television device, or a portable media player, can receive and provide location signals or location information from any suitable mechanisms (e.g., such as a global positioning system satellites, a mobile telephone tower, a wireless network transceiver, etc.). For example, a tablet computing device can associated with one or more wireless network transceivers and provide that location information.

Figure 6:
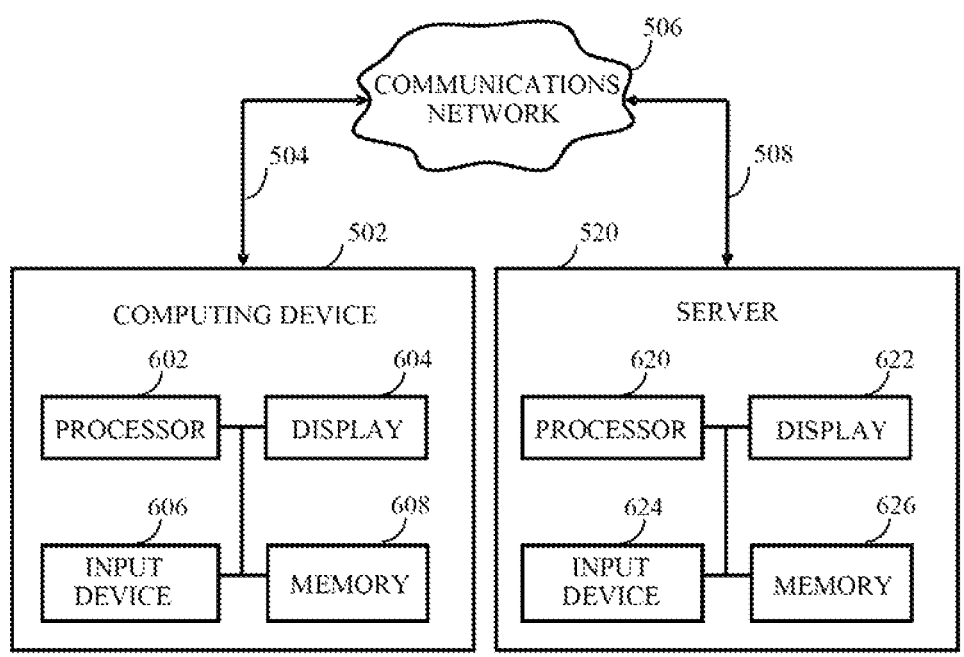
FIG. 6 is a diagram of an illustrative computing device and server as provided, for example, in FIG. 5 in accordance with some embodiments of the disclosed subject matter.

Referring back to FIG. 5, the server and one of the computing devices depicted in FIG. 5 are illustrated in more detail in FIG. 6. Referring to FIG. 6, computing device 502 can include a processor 602, a display 604, an input device 606, and memory 608, which may be interconnected. In some embodiments, memory 608 contains a storage device for storing a computer program for controlling processor 602.

Processor 602 uses the computer program to present on display 604 the geo-social targeting approaches and the data received through communications link 504 and commands and values transmitted by a user of computing device 502. It should also be noted that data received through communications link 504 or any other communications links can be received from any suitable source. Input device 606 can be a computer keyboard, a mouse, a cursor-controller, dial, switchbank, lever, or any other suitable input device as would be used by a designer of input systems or process control systems. Alternatively, input device 606 can be a finger or stylus used on a touch screen display 604.

Server 510 can include a processor 620, a display 622, an input device 624, and memory 626, which may be interconnected. In a preferred embodiment, memory 626 contains a storage device for storing data received through communications link 508 or through other links, and also receives commands and values transmitted by one or more users. The storage device further contains a server program for controlling processor 620.

In some embodiments, the mechanisms for geo-social targeting can include an application program interface (not shown), or alternatively, the application can be resident in the memory of computing device 502 or server 510. In another suitable embodiment, the only distribution to computing device 502 can be a graphical user interface ("GUI") which allows a user to interact with the application resident at, for example, server 510.

In one particular embodiment, the mechanisms for geo-social targeting can include client-side software, hardware, or both. For example, the application can encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a computing device and/or server, this is only illustrative. The application can be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method comprising:
continuously monitoring, using a hardware processor, a data stream that includes location information for a plurality of mobile devices;
extracting, from the data stream using the hardware processor, a first plurality of location information associated with a first mobile device from the plurality of mobile devices;
irreversibly anonymizing the first plurality of location information to produce a first plurality of anonymous location information, the first plurality of anonymous location information associated with a first anonymous identifier associated with the first mobile device, the first plurality of location information extracted from the data stream and anonymized without storing the first plurality of location information;
extracting, from the data stream using the hardware processor, a second plurality of location information associated with a second mobile device from the plurality of mobile devices;
irreversibly anonymizing the second plurality of location information to produce a second plurality of anonymous location information, the second plurality of anonymous location information associated with a second anonymous identifier associated with the second mobile device, the second plurality of location information extracted from the data stream and anonymized without storing the second plurality of location information;
generating, using the hardware processor, a location profile for the first anonymous identifier including a representation of each item of location information from the first plurality of anonymous location information;
generating, using the hardware processor, a location profile for the second anonymous identifier including a representation of each item of location information from the second plurality of anonymous location information;
receiving a seed identifier associated with a target location, the seed identifier matching the first anonymous identifier;
generating, using the hardware processor, a geo-social network for a plurality of anonymous identifiers including the first anonymous identifier and the second anonymous identifier, the geo-social network including a plurality of links, each link representing a similarity between location profiles associated with anonymous identifiers from the plurality of anonymous identifiers, the geo-social network including a link from the plurality of links between the first anonymous identifier and the second anonymous identifier based on a similarity between the first plurality anonymous location information and the second plurality of anonymous location information, the link between the first anonymous identifier and the second anonymous identifier indicating that the second anonymous identifier is a neighbor of the first anonymous identifier;
applying a weight to the link between the first anonymous identifier and the second anonymous identifier, the weight being inversely proportional to a popularity of an item of anonymous location information common to the first plurality of anonymous location information and the second plurality of anonymous location information;
identifying, using the hardware processor, a subset of the plurality of anonymous identifiers, including the second anonymous identifier, that are linked to the first anonymous identifier with links having a weight greater than a threshold value, the plurality of anonymous identifiers identified based on similarities in location profiles that include representations of anonymous location information such that the subset of the plurality of anonymous identifiers are identified without storing location information; and providing, using the hardware processor, the media content to a subset of the plurality of mobile devices associated with the subset of the plurality of anonymous identifiers.

2. The method of claim 1, wherein the location profile for the first anonymous identifier and the location profile for the second anonymous identifier each includes a distribution of anonymous location information.

3. The method of claim 2, wherein the first plurality of location information is from a superset of location information associated with the first mobile device, the first plurality of location information selected from the superset of location information for extraction from the data stream based on the first plurality of location information being associated with internet access points used by the first mobile device more frequently than internet access points associated with the superset of location information not included within the first plurality of location information.

4. The method of claim 1, further comprising:
determining a popularity score for the first anonymous identifier based on a frequency of an item of anonymous location information within the first plurality of anonymous location information relative to a frequency of that item of anonymous location information associated with the remaining anonymous identifiers from the plurality of anonymous identifiers;
determining a popularity score for the second anonymous identifier based on a frequency of the item of anonymous location information within the second plurality of anonymous location information relative to the frequency of that item of anonymous location information associated with the remaining anonymous identifiers from the plurality of anonymous identifiers; and
determining the weight applied to the link based on a comparison of the popularity score for the first mobile device with the popularity score for the second mobile device.

5. The method of claim 1, further comprising determining the weight applied to the link based on a number items of anonymous location information shared between the first plurality of anonymous location information and the second plurality of anonymous location information normalized over a total number of items of anonymous location information within the first plurality of anonymous location information and the second plurality of anonymized location information.

6. The method of claim 1, further comprising determining the weight applied to the link based on recency of items of anonymous location information within the first plurality of location information and the second plurality of anonymous location information by applying an exponential decay function.

7. The method of claim 1, further comprising:
identifying the first anonymous identifier and the second anonymous identifier as being associated with a common anonymous user based on the weight of the link being greater than a predetermined value.

8. The method of claim 1, wherein the link is a first link from a plurality of links, the method further comprising:
determining a plurality of first-degree network neighbors to the anonymous identifier, the plurality of first-degree network neighbors including the second anonymous identifier, a link from the plurality of links being between the first anonymous identifier and each first-degree network neighbor from the plurality of first-degree network neighbors;
determining a weight for each link from the plurality of links based on a comparison of the first plurality of anonymous location information to an anonymous location profile for each first degree network neighbor of the first degree network neighbors;
filtering the plurality of first-degree network neighbors based on a weight of a link from the plurality of links between the first anonymous identifier and that first-degree network neighbor to produce filtered network neighbors; and
providing the media content to the first mobile device and mobile devices associated with the filtered network neighbors.

9. A method, comprising:
receiving, using a hardware processor, mobile device information including location information corresponding to a plurality of mobile devices;
irreversibly anonymizing the mobile device information such that (i) each mobile device from the plurality of mobile devices is assigned an anonymous identifier from a plurality of anonymous identifiers and (ii) location information for each mobile device is converted to an anonymous location profile by applying a many-to-one hash function to each item of location information a plurality of times;
defining a plurality of anonymized user profiles, each anonymized user profile including an anonymous identifier from the plurality of anonymous identifiers and a sparse vector representing a subset of the plurality of anonymous identifiers such that each anonymized user profile from the plurality of anonymized user profiles includes anonymous representations of locations associated with a mobile device from the plurality of mobile devices and an identifier associated with that mobile device;
selecting, using the hardware processor, a first anonymous identifier from the plurality of anonymous identifiers;
constructing, using the hardware processor, a geosocial network around the first anonymous identifier, the first anonymous identifier linked to a subset of the plurality of anonymous identifiers via a plurality of links, each link from the plurality of links representing an anonymous identifier common between a sparse vector associated with the first anonymous identifier and a sparse vector associated with an anonymous identifier from the subset of the plurality of anonymous identifiers;
defining, using the hardware processor, a similarity metric between the sparse vector representing the first user profile and a sparse vector representing each anonymous identifier from the subset of the plurality of anonymous identifiers; and
providing, using the hardware processor, the media content to a portion of the plurality of mobile devices associated with a portion of the subset of the plurality of anonymous identifiers based on the similarity metric for the portion of the subset of the plurality of anonymous identifiers being above a threshold value.

10. The method of claim 9, wherein the geo social similarity metric includes a function for at least one of: location popularity, recency, and visitation frequency.

11. The method of claim 9, wherein the location information includes internet protocol (IP) addresses associated with internet access points used by the plurality of mobile devices.

12. The method of claim 9, wherein the similarity metric is a Jaccard metric.

13. A non-transitory processor readable medium storing code representing instructions configured to be executed on a processor, the code configured to cause the processor to:
continuously monitor a data stream that includes location information for a plurality of compute devices;
define a plurality of anonymized user profiles,
each anonymized user profile from the plurality of anonymized user profiles defined by irreversibly hashing an identifier associated with a compute device from the plurality of compute devices,
each anonymized user profile associated with a plurality of obfuscated location identifiers, each obfuscated location identifier from the plurality of obfuscated location identifiers defined by applying a many-to-one hash function to an item of location information extracted from the data stream a plurality of times,
each obfuscated location identifier from the plurality of obfuscated location identifies associated with a location at which a compute device associated with that user profile and from the plurality of compute devices was present, a geographical position of that location not being identifiable based solely on that obfuscated location identifier,
each anonymized user profile including an approximate distribution including a sparse vector representing a predefined number of the most frequently occurring obfuscated location identifiers for that anonymized location profile;
identify a seed user profile from the plurality of anonymized user profiles;
construct a geosocial network around the seed user profile, the seed user profile linked to a neighbor user profile based on a shared obfuscated location identifier, the neighbor user profile being from the plurality of anonymized user profiles, the shared obfuscated location identifier being an obfuscated location identifier included within the approximate distribution of the anonymized user profile for the seed user profile and the approximate distribution of the anonymized user profile for the neighbor user profile;
define a similarity metric between a sparse vector representing the seed user profile and a sparse vector representing the neighbor user profile;
identify the neighbor user profile and the seed user profile as being associated with a common user based on the similarity metric being greater than a predetermined value such that the neighbor user profile and seed user profile are identified as associated with the common user without identifying an identity of the common user or the any location associated with an obfuscated location identifier; and
providing media content to a compute device associated with the neighbor user profile based on the neighbor user profile and the seed user profile being identified as being associated with the common user.

14. The non-transitory processor readable medium of claim 13, wherein the seed user profile is identified based on a preferred characteristic associated with a marketing campaign.

15. The non-transitory processor readable medium of claim 13, wherein the similarity metric is at least one of a Hadamard product, an inner product, a cosine similarity, or a Jaccard metric of the sparse vector representing the seed user profile and the sparse vector representing the neighbor user profile.

16. The non-transitory processor readable medium of claim 13, wherein the location associated with each obfuscated location identifier from the plurality of obfuscated location identifies is also associated with is an internet protocol (IP) address associated with an internet access point used by a mobile device.

* * * * *